United States Patent
Poon et al.

[11] Patent Number: 5,907,144
[45] Date of Patent: May 25, 1999

[54] MICROSCOPIC BAR CODE FOR COMPONENT IDENTIFICATION AND METHOD FOR MAKING SAME

[75] Inventors: Chie Ching Poon; Clarence Jacob Spector, both of San Jose; Andrew Ching Tam, Saratoga, all of Calif.

[73] Assignee: International Business Machines Corporation, Armonk, N.Y.

[21] Appl. No.: 08/795,579

[22] Filed: Feb. 5, 1997

[51] Int. Cl.⁶ .................................................. G06K 7/10
[52] U.S. Cl. ................... 235/462.08; 235/464; 235/454; 235/462.32
[58] Field of Search ................... 235/462, 464, 235/454, 462.08, 462.32, 462.36, 494; 902/23

[56] References Cited

U.S. PATENT DOCUMENTS

| | | | |
|---|---|---|---|
| 4,166,574 | 9/1979 | Yokoyama | 235/464 |
| 4,383,276 | 5/1983 | Makino | 358/342 |
| 4,585,931 | 4/1986 | Duncan et al. | 235/464 |
| 4,652,733 | 3/1987 | Eng et al. | 235/462 |
| 4,677,604 | 6/1987 | Selby, III et al. | 369/33 |
| 4,744,074 | 5/1988 | Imanaka et al. | 369/278 |
| 4,794,238 | 12/1988 | Hampton | 235/462 |
| 4,806,731 | 2/1989 | Bragard et al. | 219/121.69 |
| 4,814,589 | 3/1989 | Storch et al. | 235/462 |
| 4,961,077 | 10/1990 | Wilson et al. | 346/1.1 |
| 4,983,815 | 1/1991 | Kumasaka | 235/462 |
| 5,016,240 | 5/1991 | Strandjord et al. | 369/288 |
| 5,062,021 | 10/1991 | Ranjan et al. | 360/135 |
| 5,108,781 | 4/1992 | Ranjan et al. | 427/53.1 |
| 5,118,369 | 6/1992 | Shamir | 156/64 |
| 5,129,974 | 7/1992 | Aurenius | 156/64 |
| 5,175,425 | 12/1992 | Spratte et al. | 235/494 |
| 5,210,545 | 5/1993 | Tomita | 346/1.1 |
| 5,210,672 | 5/1993 | Ivers et al. | 360/135 |
| 5,216,234 | 6/1993 | Bell | 235/494 |
| 5,283,422 | 2/1994 | Storch et al. | 235/375 |
| 5,489,768 | 2/1996 | Brownstein et al. | 235/414 |
| 5,513,169 | 4/1996 | Fite et al. | 369/272 |
| 5,706,266 | 1/1998 | Brownstein et al. | 369/58 |
| 5,751,471 | 5/1998 | Chen et al. | 359/319 |
| 5,761,301 | 6/1998 | Oshima et al. | 380/4 |

FOREIGN PATENT DOCUMENTS

| | | |
|---|---|---|
| 1-130323 | 5/1989 | Japan . |
| 2-096944 | 4/1990 | Japan . |
| 2-173994 | 7/1990 | Japan . |
| 7-182659 | 7/1995 | Japan . |

OTHER PUBLICATIONS

"Bar Code Scan Head for Reading Etched Marks on Metallic Surfaces," *IBM Technical Disclosure Bulletin*, vol. 28, No. 9, Feb. 1986, p. 4162.

"Linear Detector Array Bar Code Reader," *IBM Research Disclosure*, Dec. 1986.

"In Fab Identification of Silicon Wafers with Clean, Laser Marked Barcodes," *IEEE/SMI 1994 Advanced Semiconductor Manufacturing Conference and Workshop*, Nov. 1994, pp. 157–160.

*Primary Examiner*—Thien Le
*Assistant Examiner*—Douglas X. Rodriguez
*Attorney, Agent, or Firm*—Jenkins & Gilchrist; G. Marlin Knight

[57] ABSTRACT

The invention is a method and apparatus for imprinting a microscopic code on a small surface, such as the edge of a magnetic disk, or the head used to read or write information to the disk and a magnetic disk imprinted with such microscopic identification codes. The invention provides a way to identify products using microscopic codes, such as bar codes, by using a laser to imprint such microscopic bar codes on a product. The identification meets the stringent cleanliness requirements of the computer industry without generating debris, and so is exceptionally suited for use in identifying hard disks and heads used in a disk drive.

21 Claims, 2 Drawing Sheets

MICROSCOPIC BAR CODE FOR COMPONENT IDENTIFICATION AND METHOD FOR MAKING SAME

FIELD OF THE INVENTION

The present invention relates to the field of identification techniques based on microscopic bar codes or similar patterns. More particularly, the invention pertains to the use of lasers to imprint a microscopic bar code on small surfaces such as the edge of a magnetic disk or the head used to read or write information in a disk drive.

BACKGROUND OF THE INVENTION

The identification of very similar items is important to many businesses. An example is in magnetic storage in which magnetic disks are used in large quantities. The magnetic disks can differ in source, batch, and specifications. Being able to identify the disks can be vital to the manufacturing process whenever head/disk assemblies (HDAs) are reworked and disks reused. Identifying disks also is important to redevelopment when disks fabricated at various design parameters undergo extensive and expensive experiments. Product identification also becomes important if an unfortunate product recall is necessary. The evolution of a disk is traceable only if it can be uniquely identified. The current disk product does not have any coding for identification. Since disk problems can be supplier, machine, or even operator related, the need for disk identification is real and immediate. Cleanliness in micro-machining also is very important for products such as magnetic disks and heads used in disk drives as any contamination is trapped inside a file and can degrade performance.

Fourteen-inch and 275-mm disks of past vintage were uniquely identifiable with both alphanumeric serial numbers and machine readable bar codes. The coding had been done with an elaborate tool which was later discarded to reduce manufacturing cost. The current disk product therefore is not coded for identification. Problems have arisen in manufacturing when disks of uncertain performance are reused in HDAS, and in development when test data of disks of different specifications cannot be interpreted because the disks have been intermixed in testers/HDAs. The only sure way to curb such problems is to permanently code the disks for identification.

A disk drive or DASD includes several disks which look similar to records used on a record player or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, the surface of each disk is divided into portions where data is stored. There are a number of tracks of the disk situated in concentric circles like rings on a tree. Compact disks have tracks as do the disks in a disk drive. The tracks in either the disk drive or the compact disk essentially replace the grooves on a conventional record. Each track in a disk drive is further subdivided into a number of sectors, where each sector is essentially just one section of the circumferential track.

Disks in a disk drive are made of a variety of materials. Most commonly, the disk is made of metal or plastic. The material from which the disk is made determines how data is stored on the disk. A plastic disk, such as those used as CDs, stores data using lasers and a laser is used to read the data back. Storage of data on a metal disk entails magnetizing portions of the disk in a pattern which reflects the data.

To store data on a metal disk, the metal disk is magnetized. In order to magnetize the surface of a disk, a small ceramic slider which contains a magnetic transducer known as a write head is passed over the surface of the disk. More specifically, the write head is flown at a height of less than six millionths of an inch from the surface of the disk and is flown over the track as the write head is energized to various states causing the track below to be magnetized to represent the data to be stored.

To retrieve data stored on a magnetic disk, a ceramic slider which contains a read head is flown over the metal disk. The magnetized portions of the disk induce a current in the read head. By looking at output from the read head, the data can be reconstructed for use by the computer system.

Typically, the same ceramic slider contains both a read head and a write head.

Like a record, both sides of a disk are generally used to store data or other information necessary for the operation of the disk drive. Since the disks are held in a stack and are spaced apart from one another, both the top and the bottom surface of each disk in the stack of disks has a ceramic slider associated with each surface. This would be comparable to having a stereo that could play both sides of a record at once. In the record analogy, each side would have a stylus which played the particular side of the record.

One method for identifying a disk is to place a bar code in a bar code region on the surface or edge of the disk. A bar code region is an area on the exterior surface of an object, such as a disk, which is relatively flat and smooth. It is possible to have such a flat, bar code region on the edge of a disk, provided that the curvature of the disk is small relative to the dimensions of the bar code region. A bar code is a number of bars and spaces of varying dimensions. There are several bar code symbologies available, each using its own coding system.

SUMMARY OF THE INVENTION

It is an object of the invention to provide a means for identifying products using microscopic identification codes such as bar codes.

It is a further object of the invention to provide an identification means suitable for the stringent cleanliness requirements needed in the computer disk-drive industry.

A further object of the invention is to provide a method for using a laser to imprint microscopic bar codes on a product.

The invention is a method and apparatus for imprinting a microscopic code on an object, such as the edge of a magnetic disk or the head used to read or write information to the disk, and a magnetic disk imprinted with such microscopic identification codes. The invention provides a way to identify products using microscopic codes, such as bar codes, by using a laser to imprint such microscopic bar codes on a product. It is an advantage of the invention that the identification means meets the stringent cleanliness requirements of the computer industry and so is exceptionally suited for use in identifying hard disks and heads used in a disk drive.

DETAILED DESCRIPTION OF THE INVENTION

We disclose a method of micro-machining bars or other patterns on a surface without producing contamination. We demonstrate the method by micro-machining a bar code on the edge of a magnetic disk as an example. The method uses a laser to scan over a small area to produce the bars or patterns. We use a focused pulsed laser such as one that produces a beam of diameter 20 micrometers and duration of 12 nanoseconds to cause fast local surface melting of the metal material of the disk. The shallow molten metal flows away from the irradiated area due to thermocapillary or surface-tension forces to leave a depression on the surface of the disk. As the laser scans with proper spot overlap, the depression lengthens to produce a microscopically detectable line which is about one micrometer or less in depth and one micrometer or more in width. We have micro-machined bar code characters, based on the Code 39 symbology, on the edge of a production 3.5 inch magnetic disk. The pattern can be read using a reading system such as a magnifying and noise-filter and CCD camera and monitoring system. The height of the bars can be as short as a few micrometers. The total width of the entire micro-barcode depends on the number of characters and type of code used.

Figure 1:
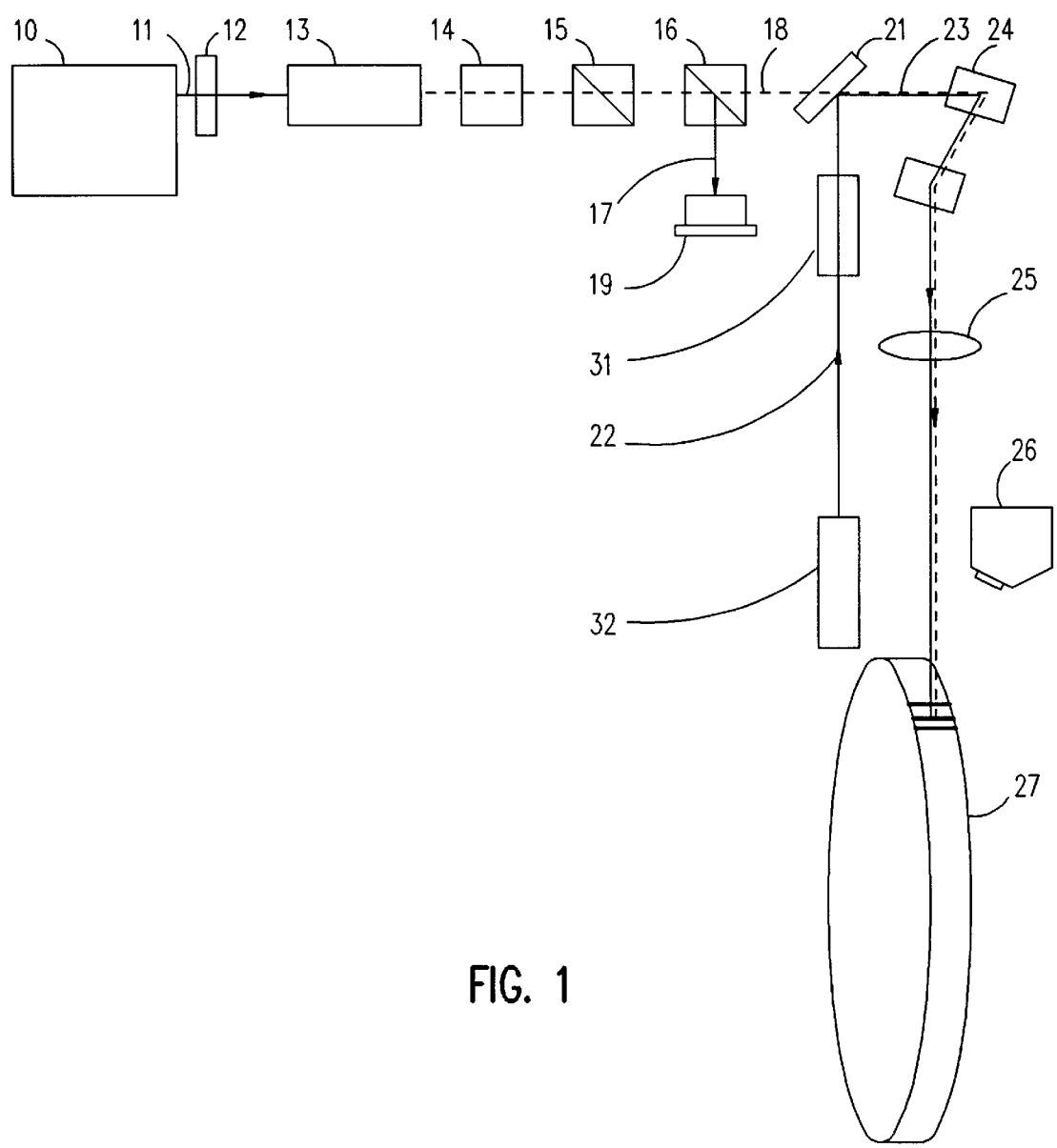
FIG. 1 is a schematic of a tool for coding a magnetic disk by laser micro-machining in accordance with the present invention.

The implementation of the invention makes use of a small diode-pumped pulsed laser typically of 12 nanosecond duration. Briefly, the laser beam profile and energy is properly conditioned and directed to a two-axis Galvo scanner. The rotation of the two mirrors on the scanner reflects the laser beam in a way such that it is focused by a lens onto any point in a plane normal to its direction of propagation. By rotating the Galvo mirrors and shuttering the laser as it scans, the focused laser beam traverses a pattern on the disk surface. When the shutter opens, the laser melts the surface material which moves laterally to the scan direction by the action of surface tension to form a line. Thus the coding of the disk is accomplished. The width of an element of the code can be increased by decreasing the scan speed and/or increasing the pulse energy. The control of the line width is desired because many prevailing bar code symbologies require two or more widths. An actual implementation of the invention is shown in FIG. 1. Pertinent information about various aspects of FIGS. 1 through 5 follows.

FIG. 1 shows a laser 10 set at 1047 nanometers. Light 11 flows from the laser 10 through a laser shutter 12. The light 11 leaves the laser shutter 12 and enters a beam expander 13 and then a liquid crystal variation retarder 14. A polarizing beam splitter 15 polarizes the light 11. The light 11 then flows in to a low reflectance beam splitter 16. The light 11 then is split into two beams 17 and 18. Beam 17 is directed to power meter sensor 19. Beam 18 is directed to a dichroic mirror 21. In the dichroic mirror 21 beam 18 is joined by beam 22 which emanates from diode laser 32 which is set at 675 nanometers. Beam 22, emanating from diode laser 32, passes through beam expander 31 prior to reaching dichroic mirror 21. Beams 18 and 22 leave the dichroic mirror 21 as beam 23. Beam 23 then passes through the two-axis Galvo mirrors 24 and then through focusing lens 25. From focusing lens 25 the beam 23 is directed to the object 27 to be microscopically encoded. In FIG. 1 object 27 is a magnetic hard disk suitable for use in a disk drive. The bar-code scribing can be observed by means of an off-axis vision system 26.

The arrangement shown in FIG. 1 can be generally referred to as a coding tool. The coding tool consists of a pulse laser 10 which generates energy pulses for micro-machining. In the preferred embodiment of the invention, the laser 10 is an infra-red (IR) Nd:YLF acousto-optically Q-switched laser. This type of laser is compact, has minimal maintenance requirements, and operates from low to high pulse rate. Thus the tool can be very small and have low maintenance cost. The last feature is particularly important to effect a wide process window. A high speed shutter 12 is placed close to the exit of the laser 10 head. The opening and closing of this shutter 12 controls the physical appearance of the coding. The shutter 12 also facilitates laser safety for the tool. The laser beam 11 is conditioned with beam expander 13 to produce an expanded and collimated beam. The expansion is required to reduce the diameter of the ultimately focused beam and therefore the width of the micro-machined path. The combination of the variable retarder 14 and the polarizing beam splitter 15 provides electronic adjustment of pulse energy in beam 11. A second beam splitter 16 of low reflectance diverts a small amount of power to a power meter 19 for on-line monitoring. A two-axis Galvo mirror 24 reflects the laser beam 23 such that its focus can be placed anywhere in a plane which is the coding area.

Because the IR laser beam 11 is invisible, a red diode laser 32 at 675 nanometer wavelength provides an indicator beam 22 for the IR laser 10. The beam expander 31 conditions the diode laser beam so that its focused spot is small. The dichroic mirror 21 is dielectrically coated to combine the transmitted IR beam 11 and the reflected red laser beam 22. The two beams 11 and 22 are configured to be superposed upon leaving this mirror 21.

The combined laser beams then pass through the focusing lens 25 which focuses them onto the disk 27 surface. The separation between the downstream Galvo mirror 24 (the second of two mirrors on the scanner) and the lens 25 is chosen to provide telecentric spanning such that any off-axis ray originating from the Galvo mirror 24 is refracted parallel to the axis of the lens.

A vision system 26 is installed in this tool. Alternatively, a combination of a beam splitter placed in the path of the IR/diode laser beams 23, other optics items, and a CCD camera can also serve the purpose.

In actual application, the disk 27 is brought to the focus of the achromatic lens 25 by the use of an intelligent focusing system (not included in this invention) and is held stationary. At this point, the red laser beam 23 should be at the starting point of the coding pattern. When the micro-machining cycle begins, the Galvo mirrors 24 rotate from their park positions. At the correct instants, the shutter 12 opens and closes to allow the machining of the pattern until it is complete on the disk 27. A second disk can be brought to the focus of the laser beam 23 to repeat the process.

The integrity of the micro-machined path depends on several parameters specially selected to match the properties of the disk material. For the present application on both Nickel-Phosphorous (NiP) plated and bare Aluminum-Magnesium (AlMg) surfaces, the pertinent parameters are as follows:

1. Typical lasers—Nd:YLF or Nd:YAG acousto-optically Q-switched pulse laser for metal and CO2 pulse laser for glass 2. Laser energy per pulse—1 µJ to 50 µJ 3. Laser pulse repetition rate—100 Hz to 100 KHz 4. Laser pulse width—1 ns to 500 ns 5. machining speed—0.5 mm/sec to 50 mm/sec 6. IR laser waist diameter on target surface—1 µm to 50 µm These processing parameters will change depending upon the object to be micro-encoded.

Figure 2:
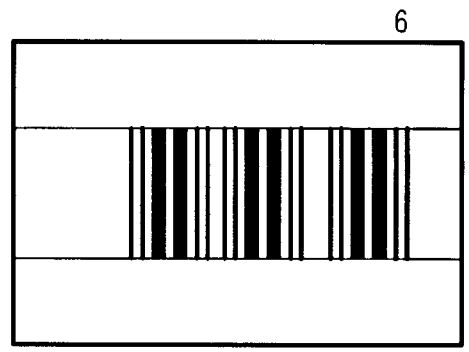
FIG. 2 is a diagram of an imprinted microscopic bar code on the edge of a magnetic disk.

FIG. 2 shows the laser micro-machined code "6" based on Code 39 symbology on the edge of a thin-film magnetic disk.

Figure 3:
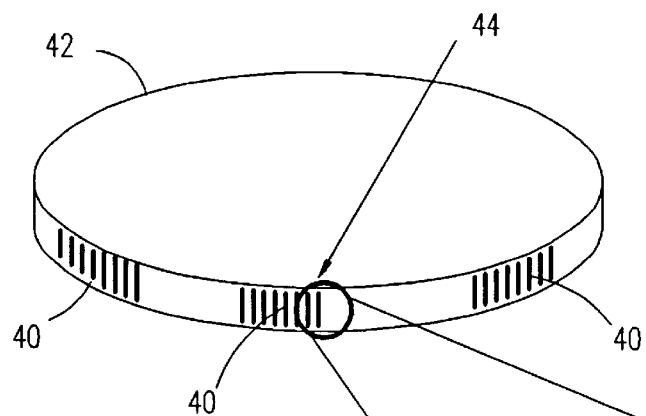
FIG. 3 is a diagram of a magnetic disk with bar codes imprinted on the edge of the disk in accordance with the present invention.
Figure 4:
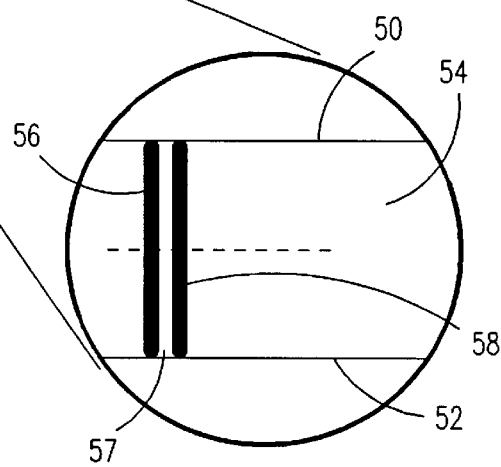
FIG. 4 is a diagram of one bar code line within a bar code shown in FIG. 3.

FIG. 3 shows a magnetic disk imprinted with the bar code shown in FIG. 2. Typically, redundant bar codes 40 are imprinted at regular intervals on the edge of a magnetic disk 42. A single bar code line 44 is magnified and depicted in FIG. 4. As shown in FIG. 4, the bar code line is actually a depression 57 in the disk edge 54. There are two ridges, 56 and 58, on either side of the depression 57. These ridges are formed from the molten metal that flows away and drifts up as the laser scans the disk edge 54. The bar code line is on the outer edge of the magnetic disk, between the upper surface 50 and lower surface 52 of the disk.

Figure 5:
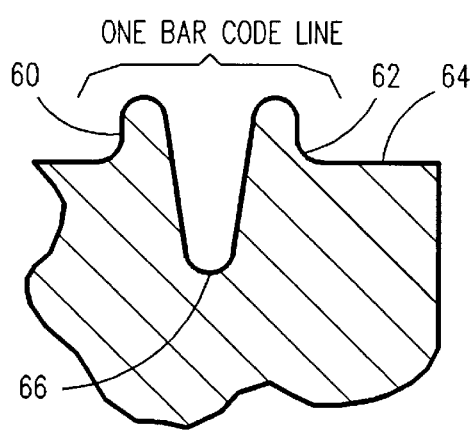
FIG. 5 is a cross-sectional view of one bar code line.

FIG. 5 shows a cross-sectional view of the same bar code line shown in FIG. 4. The bar code line consists of a depression 66 in the disk edge 64 between two ridges, 60 and 62.

This laser bar coding process will be of interest to any business which wishes to identify its product such that the coding is microscopic. It is particularly attractive to storage systems companies because of its microscopic size and contamination free features. In this respect, the process can be applied, with an appropriate selection of laser parameters, to the coding of disks, pico or smaller sliders and other critical components. Currently, the slider is identified by relatively large alphanumeric characters produced by ablation of the ceramic surface using elaborate tools built with large and repair-prone lasers. The present method uses simple equipment and does not create mechanical stress to the part or contamination problems.

What is claimed is:

1. An apparatus for imprinting a microscopic code on a disk comprising:

means for focusing a pulsed laser beam on to an outer circumferential surface of the disk, the outer circumferential surface being substantially perpendicular to two planar surfaces of the disk;

means for two-axis spot scanning the laser beam on the outer circumferential surface to cause fast local surface melting and flowing away of the melted substance from the irradiated area to leave a depression and a ridge on the surface without generating debris; and means for directing the means for two-axis spot scanning to move over the outer circumferential surface to form coded identifiers from a plurality of depressions and ridges.

2. An apparatus in accordance with claim 1 further comprising:

a laser source which generates a first beam of energy pulses;

a shutter which opens and closes to allow the machining of a pattern;

means for conditioning the first beam to produce an expanded and collimated beam;

means for adjusting the pulse energy of the first beam;

means for on-line monitoring of the first beam;

means for providing an indicator beam, means for combining the first beam with the indicator beam to form a collinear beam; and means for reflecting and focusing the collinear beam onto any point in a plane normal to its direction of propagation.

3. An apparatus in accordance with claim 2, wherein the disk is made of glass.

4. An apparatus in accordance with claim 2, wherein the laser source is an infra-red (IR) Nd:YLF acousto-optically Q-switched laser.

5. A apparatus in accordance with claim 2, wherein the the first beam has a waist diameter on the target surface from 1 µm to 50 µm.

6. An apparatus in accordance with claim 2, wherein the means for monitoring the first beam comprises a low reflectance beam splitter which diverts a small amount of power from the expanded and collimated beam to a power meter for on-line monitoring.

7. An apparatus in accordance with claim 2, wherein the means for providing an indicator beam further comprises:

a visible diode laser beam; and a beam expander which conditions the visible diode laser beam to produce an expanded and collimated beam.

8. An apparatus coding tool in accordance with claim 2, wherein the means for combining the first beam with the indicator beam is a dielectrically coated dichroic mirror.

9. An apparatus in accordance with claim 2, wherein the means for reflecting and focusing the combined collinear beam comprises:

a two-axis Galvo scanner; and a focusing lens.

10. An apparatus in accordance with claim 1 further comprising a liquid crystal variable retarder and a polarizing beam splitter connected to effect control of the pulse energy of the first beam.

11. A method for imprinting a microscopic code on a disk comprising the steps of:

focusing a pulsed laser beam on to an outer circumferential surface of the disk to be imprinted, the outer circumferential surface being substantially perpendicular to two planar surfaces of the disk; and spot scanning the laser beam on the outer circumferential surface using a two-axis deflector to move the laser beam over the outer circumferential surface to form coded identifiers from a plurality of depressions and ridges by causing fast local surface melting and flowing away of the melted substance from a series of elongated areas to leave depressions and ridges on the outer circumferential surface without generating debris.

12. A method for imprinting a microscopic code on an object in accordance with claim 11, wherein the object to be imprinted is a computer disk.

13. The method of claim 11 further comprising the steps of:

generating the laser beam with a pulse repetition rate from 100 Hz to 100 KHz;

opening and closing a shutter which blocks the laser beam in coordination with the two axis deflectors to control the location of the depressions and ridges; and adjusting the pulse energy of the beam to be from 1 µJ to 50 µJ per pulse.

14. A method in accordance with claim 13, wherein the object to be imprinted is a computer disk.

15. A method in accordance with claim 13, wherein the laser source is an infra-red (IR) Nd:YLF acousto-optically Q-switched laser.

16. The method in accordance with claim 13, wherein the beam is conditioned by using a collimator.

17. The method in accordance with claim 13, wherein the step of adjusting the pulse energy of the beam utilizes a liquid crystal variable retarder and a polarizing beam splitter.

18. The method in accordance with claim 13, further comprising the step of monitoring the beam utilizing a low reflectance beam splitter which diverts a small amount of power from the beam to a power meter for on-line monitoring.

19. The method in accordance with claim 13, further comprising the step of providing an indicator beam further comprises the steps of:

generating a visible diode laser beam; and conditioning the visible diode laser beam to produce an expanded and collimated visible diode laser beam.

20. A method in accordance with claim 19, further comprising the step of combining the beam with the expanded and collimated visible diode laser beam utilizing a dielectrically coated dichroic mirror to produce a combined beam.

21. The method in accordance with claim 20, further comprising the step of reflecting the combined beam utilizing a two-axis Galvo scanner.

\* \* \* \* \*